United States Patent
Ishii et al.

[11] Patent Number: 6,120,655
[45] Date of Patent: Sep. 19, 2000

[54] PROCESS FOR PRODUCING PRINTING PLATE FOR PLATEMAKING BY INK-JET SYSTEM

[75] Inventors: Kazuo Ishii; Sadao Osawa; Eiichi Kato, all of Shizuoka, Japan

[73] Assignee: Fuji Photo Film Co., Ltd., Kanagawa, Japan

[21] Appl. No.: 09/009,542

[22] Filed: Jan. 20, 1998

[30] Foreign Application Priority Data

Jan. 20, 1997 [JP] Japan ................................. 9-21013

[51] Int. Cl.[7] ................................................ H05F 3/00
[52] U.S. Cl. ................................ 204/164; 101/463.1
[58] Field of Search ............................. 204/164; 430/49; 96/1, 1.5; 428/511; 29/890.1; 347/100, 120, 168, 170, 163; 101/463.1

[56] References Cited

U.S. PATENT DOCUMENTS

| | | | |
|---|---|---|---|
| 2,297,691 | 10/1942 | Carlson | 95/5 |
| 2,899,335 | 8/1959 | Straugham | 117/37 |
| 3,247,290 | 4/1966 | Werkman | 260/897 |
| 3,411,908 | 11/1968 | Crawford | 96/74 |
| 4,606,989 | 8/1986 | Uytterhoeven | 430/106 |
| 4,729,310 | 3/1988 | Love, III | 101/157 |
| 4,833,486 | 5/1989 | Zerillo | 346/1.1 |
| 4,970,130 | 11/1990 | Tam | 430/41 |
| 5,153,618 | 10/1992 | Frank | 346/159 |
| 5,424,155 | 6/1995 | Nakayama | 430/49 |
| 5,561,014 | 10/1996 | Kato | 430/49 |
| 5,852,975 | 12/1998 | Miyabe | 101/463.1 |

OTHER PUBLICATIONS

Shah, Handbook of Plastic Technology ISBN 0–471–07871–9 Wiley, No date available/1984.
Shah, Handbook of Plastic Technology, ISBN 0–471–07871–9, No month available/1984.

Primary Examiner—Kathryn Gorgos
Assistant Examiner—J. Maisano
Attorney, Agent, or Firm—Sughrue, Mion, Zinn, Macpeak & Seas, PLLC

[57] ABSTRACT

A process for producing a lithographic printing plate for platemaking by the ink-jet system comprising forming images by jetting oily ink toward an image receiving layer formed on a water-resistant support with the aid of the electrostatic field, wherein the water-resistant support is a paper support both sides of which are covered with a resin. The process of the present invention can yield a large number of printed sheets with sharp images.

8 Claims, 2 Drawing Sheets

PROCESS FOR PRODUCING PRINTING PLATE FOR PLATEMAKING BY INK-JET SYSTEM

FIELD OF THE INVENTION

The present invention relates to a process for producing a lithographic printing plate for the ink-jet recording system. More specifically, the present invention relates to a process for producing a printing plate for platemaking by the ink-jet system by use of oily ink, the printing plate being satisfactory in image qualities of both the printing plate itself and printed matter produced therefrom and in addition being excellent in press life.

BACKGROUND OF THE INVENTION

With the recent progress in office machinery and office automation, the offset lithographic printing system in which the printing plates are made by performing platemaking, or forming images, according to a variety of processes on direct imaging lithographic printing plate precursors that have image receiving layers formed on water-resistant supports has spread throughout the small printing field.

In conventional materials for the direct imaging lithographic printing plates, the image receiving layers are provided on paper supports on which water-resistant layers are coated. In known methods of making the printing plates, lipophilic images are formed on such direct imaging lithographic printing plate precursors by use of oily ink with typewriters or by handwriting and, alternatively, by-hot melt transfer of images from the ink ribbons of heat transfer printers; and non-image areas are then subjected to hydrophilic treatment as needed.

The printing plates thus made, however, fail to have sufficient mechanical strength in image areas or to have sufficient water resistance in paper supports, resulting in swelling or elongation of the printing plates during printing, which causes falling of the image areas.

Platemaking of these direct imaging lithographic printing plate precursors is carried out on ink-jet printers as well. Although water-based ink in which the dispersion medium is water also is used in the platemaking, use of such water-based ink introduces the problems of causing blurs in images on the printing plates and of decreasing drawing speed because the water-based ink dries only slowly. To cope with such troubles, a method of using oily ink in which the dispersion medium is a nonaqueous solvent is disclosed by JP-A-54-117203 (The term "JP-A" as used herein means an "unexamined published Japanese patent application").

However, the introduction of this method often results in clogging the jetting sections of the ink-jet printers with the ink because the ink is jetted from narrow nozzles.

SUMMARY OF THE INVENTION

In the present invention, attention has been directed to solving these problems. Thus, an object of the present invention is to provide a process for producing a printing plate for platemaking by the ink-jet system, the printing plate yielding a large number of printed sheets with sharp images.

The object given above has been attained by the present invention which is summarized in the following embodiments as items (1) to (3):

(1) A process for producing a lithographic printing plate for platemaking by the ink-jet system comprising forming images by jetting oily ink toward an image receiving layer formed on a water-resistant support with the aid of the electrostatic field, wherein said water-resistant support is a paper support both sides of which are covered with a resin.

(2) The process as described above in item (1), wherein the resin which covers both sides of the paper support is polyethylene which is a mixture comprising 10 to 90% by weight of a low-density polyethylene having a density of 0.915 to 0.930 g/cc and a melt index of 1.0 to 30.0 g/10 cc and 10 to 90% by weight of a high-density polyethylene having a density of 0.940 to 0.970 g/cc and a melt index of 1.0 to 30.0 g/10 cc.

(3) The process as described above in item (1) or (2), wherein the oily ink comprises a nonaqueous solvent of an electric resistance of $10^9$ Ωcm or more and a dielectric constant of 3.5 or less and resin particles dispersed therein which are solid at ordinary temperature and are hydrophobic.

DETAILED DESCRIPTION OF THE INVENTION

The embodiments of the present invention are illustrated in detail below.

The present invention is characterized in that images are formed by jetting oily ink with the aid of electrostatic field by the ink-jet system toward an image receiving layer that is provided on a water-resistant support, thus to obtain a lithographic printing plate from which a great number of printed sheets with sharp images can be produced.

The water-resistant support is preferably base paper of 50 to 200-μm thickness. The thickness not reaching 50 μm results in insufficient strength, whereas exceeding 200 μm causes deterioration in handling properties. The polyethylene to be covered with is preferably from 5 to 50 μm in thickness. The thickness not reaching 5 μm results in insufficient waterproofness for the base paper, whereas exceeding 50 μm fails to improve further water resistance and only leads to rise in cost. The thickness of the polyethylene is more preferably from 10 to 30 μm.

Although an ink-jet system to use the oily ink as disclosed by the above-described JP-A-54-117203 is similar to that of the present invention, the system is different from that of the present invention in that the oily ink is jetted with the aid of pressure, which makes it difficult to form fine images. In addition, aluminum plates for presensitized plates which are used as image receiving materials in JP-A-54-117203 are expensive and need large devices for handling.

In the present invention, the water absorptiveness of the water-resistant supports by Cobb test (Cobb water absorption) is preferably 0.1 g/m² or less (45-min value) and more preferably 0.05 g/m² or less (45-min value). Although the water absorptiveness is most preferably zero, the lower limit thereof is usually approximately 0.001 g/m².

When the water absorptiveness of the water-resistant supports falls in the range as specified above, penetration of fountain solution into the supports is inhibited during printing to prevent the printing plates from elongation or breaking, so that the printing plates acquire a press life of more than 10,000 sheets. The Cobb water absorption is described in JIS P8140. A test specimen is placed between a metal ring having a very smooth bottom (inner diameter:112.8 mm, area: 100 cm$^2$, height: 25 mm, thickness: 6 mm) and a base plate, and then sufficiently tightened up. The ring is then filled with 50 ml of distilled water and the weight of water absorbed by the test specimen in a definite time is measured in g/m$^2$.

In the present invention, the support's surface of the sides adjacent to the image receiving layers are restricted to 300 or more (sec/10 cc) in Bekk smoothness, thereby the printing plate being more improved in image reproducibility and press life. Such improving effect is observed even among the printing plates that have image receiving layers' surfaces exhibiting the same smoothness. It is supposed that this is due to increased adhesion between the image areas and the image receiving layer, which arises from improvement in smoothness of the support's surface.

The Bekk smoothness can be measured with a Bekk tester. The Bekk tester has a circular glass plate which is finished to a highly smooth surface and has a hole in the center. A test specimen is pressed against the glass plate at a constant pressure (1 kg/cm$^2$) and time required for a definite amount of air (10 cc) to pass between the plate surface and the test specimen under reduced pressure is measured.

The oily ink used in the present invention is a dispersion comprising as a dispersion medium a nonaqueous solvent which preferably has an electric resistance of $10^9$ Ωcm or more and a dielectric constant of 3.5 or less and resin particles dispersed thereinto which are at least solid at ordinary temperature (15 to 35° C.) and are hydrophobic as well. Use of such a dispersion medium leads to proper adjustment of the electric resistance of the oily ink and, consequently, to proper jetting of the oily ink depending on the electric field, thus to contribute to improvement in image quality.

In addition, the supports in which the polyethylene resin is laminated to both sides of base paper have excellent water resistance to improve the press life.

A process for producing the printing plates of the present invention for platemaking by the ink-jet system is explained below.

The first explanation refers to the water-resistant supports used in the present invention or the paper supports both the sides of which are covered with the polyethylene resin.

Covering of both the sides of the base paper with the polyethylene as described above is carried out by extrusion-laminating method, which is one of the characteristics of the present invention. Plate materials from which lithographic printing plates excellent in image quality and press life can be made have been produced for the first time by the covering with the polyethylene by the extrusion-laminating method. The extrusion-laminating method is a method in which a melted polyolefin is formed into a film, immediately thereafter contact-bonded to base paper, and then cooled. A variety of devices for it are known.

In the present invention, it has been found that the polyethylene layer that shows good covering film uniformity on extrusion laminating and, in addition, excellent thermal resistance is formed by using a mixture of a low-density polyethylene and a high-density polyethylene as said polyethylene.

Although a single low-density polyethylene shows good covering film uniformity on extrusion laminating, low melting points thereof lead to poor thermal resistance, which causes the following failures. That is, one of the failures is that a polyethylene layer is softened and adheres to pass rolls, because the polyethylene layer is necessarily exposed to a drying temperature of 100° C. or higher when an image receiving layer is provided on base paper. Another failure is that, when a printing plate is made, the polyethylene layer is similarly softened in the process for fixing ink images by heating, which promotes bulges (blisters) to generate between the polyethylene layer and base paper owing to a volatile component (water) contained in the base paper. On the other hand, although use of a single high-density polyethylene can avoid these troubles, it results in forming ununiform covering films on extrusion laminating and in increasing variation in adhesion to base paper, which obstructs commercialization. However, these problems have been found to be solved at once by blending suitably both the polyethylenes.

The low-density polyethylene preferably has a density of 0.915 to 0.930 g/cc and a melt index of 1.0 to 30 g/10 min and the high-density polyethylene preferably has a density of 0.940 to 0.970 g/cc and a melt index of 1.0 to 30 g/10 min. About the blending ratio of both the polyethylenes, the ratio of the low-density polyethylene not reaching 10% by weight results in forming ununiform extruded covering films to hinder normal lamination, whereas the ratio of the high-density polyethylene not reaching 10% by weight fails to give sufficient thermal resistance to the printing plates. Consequently, the blending ratio of the low-density polyethylene to the high-density polyethylene preferably is 10 to 90% by weight to 90 to 10% by weight.

The thickness of the polyethylene layer thus laminated suitably ranges from 5 to 50 μm. The thickness not more than 5 μm results in insufficient waterproofness for the base paper, whereas exceeding 50 μm fails to improve further the performance and only leads to rise in cost. Accordingly, the thickness preferably is from 10 to 30 μm.

In order to enhance the adhesion between the base paper and the polyethylene layer, it is desirable that the base paper is coated with a polyethylene derivative as given below or is subjected to corona discharge treatment beforehand. Examples of such a polyethylene derivative include ethylene-vinyl acetate copolymers, ethylene-acrylic ester copolymers, ethylene-methacrylic ester copolymers, ethylene-acrylic acid copolymers, ethylene-methacrylic acid copolymers, ethylene-acrylonitrile-acrylic acid copolymers, and ethylene-acrylonitrile-methacrylic acid copolymers. Alternatively, the base paper can be subjected to surface treatments as described in JP-A-49-24126, JP-A-52-36176, JP-A-52-121683, JP-A-53-2612, JP-A-54-111331, and JP-B-51-25337 (The term "JP-B" as used herein means an "examined Japanese patent publication).

The base paper which is supplied for the present invention is, for example, woodpulp paper, synthetic pulp paper, and paper made from a mixture of woodpulp and synthetic pulp. They can be used as such.

The laminated polyethylene layers' surfaces of the water-resistant supports, on which image receiving layers are provided, are preferably subjected to a surface treatment such as corona discharge treatment, glow discharge treatment, flame treatment, ultraviolet treatment, ozone treatment, and plasma treatment as described in U.S. Pat. No. 3,411,908 in order to enhance the adhesion of the laminated polyethylene layers to the image receiving layers. The thickness of the image receiving layers thus provided preferably ranges from 5 to 30 μm.

The image receiving layers used herein are hydrophilic layers which comprise inorganic pigments and binders or layers which can be turned into hydrophilization by desensitizing.

Examples of the inorganic pigments used for the image receiving layers which are hydrophilic include clay, silica, calcium carbonate, zinc oxide, aluminum oxide, and barium sulfonate. The binders used herein are hydrophilic binders such as polyvinyl alcohol, starch, carboxymethyl cellulose, hydroxyethyl cellulose, casein, gelatin, polyacrylic acid salts, polyvinylpyrrolidone, and polymethyl ether-maleic anhydride copolymers. In addition, melamine-formalin resins, urea-formalin resins, and other cross-linking agents can be used as needed to ensure water resistance of the image receiving layers.

On the other hand, the above-mentioned layers which can be used as the image receiving layers after desensitizing are, for example, layers containing zinc oxide and hydrophobic binders.

Zinc oxide used in the present invention include all those which are marketed as zinc oxide, zinc white, wet zinc white, and activated zinc white as described, for example, in *Shinpan Ganryo Binran* (*New Edition: Handbook of Pigments*), edited by Nippon Ganryo Gijutsu Kyokai, Seibundo, page 319 (1968).

That is, the zinc oxide include those which are called dry process such as French process (indirect process) and American process (direct process) and wet process according to starting materials and manufacturing processes. They are placed on the market, for example, by Seido Chemical Industry Co., Ltd., Sakai Chemical Industry Co., Ltd., Hakusui Chemical Industries, Ltd., The Honjo Chemical Corporation, Toho Zinc Co., Ltd., and Mitsui Mining and Smelting Co., Ltd.

On the other hand, examples of resins used as the binders include vinyl chloride-vinyl acetate copolymers, styrene-butadiene copolymers, styrene-methacrylate copolymers, methacrylate copolymers, acrylate copolymers, vinyl acetate copolymers, polyvinyl butyral, alkyd resins, epoxy resins, epoxy ester resins, polyester resins, and polyurethane resins. These resins can be used singly or as mixtures of two or more kinds thereof.

The content of the resins in the image receiving layers is preferably from 9/91 to 20/80 in weight ratio of the resins/zinc oxide.

Known processing solutions for desensitizing of zinc oxide include processing solutions which contain as main components cyan compounds such as ferrocyanates and ferricyanates; cyan-free processing solutions which contain as main components ammine cobalt complexes, phytic acid or derivatives thereof, or guanidine derivatives; processing solutions which contain as main components inorganic or organic acids that react with zinc ion to form chelates; and processing solutions which contain water-soluble polymers.

For example, the processing solutions containing the cyan compounds include those which are described in JP-B-44-9045, JP-B-46-39403, JP-A-52-76101, JP-A-57-107889, JP-A-54-117201, and others.

The oily ink used in the present invention is illustrated below.

The oily ink which is supplied for the present invention is a dispersion comprising as a dispersion medium a nonaqueous solvent which preferably has an electric resistance of $10^9$ $\Omega$cm or more and a dielectric constant of 3.5 or less; and resin particles dispersed thereinto which are at least solid at ordinary temperature and are hydrophobic as well.

The nonaqueous solvents used in the present invention, which have an electric resistance of $10^9$ $\Omega$cm or more and a dielectric constant of 3.5 or less, are preferably straight-chain or branched-chain aliphatic hydrocarbons, alicyclic hydrocarbons, aromatic hydrocarbons, and halogenated products derived from these hydrocarbons. Examples thereof include octane, isooctane, decane, isodecane, decalin, nonane, dodecane, isododecane, cyclohexane, cyclooctane, cyclodecane, benzene, toluene, xylene, mesitylene, Isoper E, Isoper G, Isoper H, Isoper L (Isoper: trade name of Exxon Corp.), Shellsol 70, Shellsol 71 (Shellsol: trade name of Shell Oil Corp.), and Amsco OMS and Amsco 460 solvents (Amsco: trade name of American Mineral Spirits Co.). These are used singly or as mixtures. In these nonaqueous solvents, the upper limit of the electric resistance is approximately $10^{16}$ $\Omega$cm and the lower limit of the dielectric constant is approximately 1.9.

The reason for specifying the electric resistance of the nonaqueous solvents as described above is that use of nonaqueous solvents having lower electric resistance than that specified above fails to properly adjust the electric resistance of the ink, resulting in disturbing the jetting of the ink which depends on the electric field. On the other hand, the reason for specifying the dielectric constant as described above is that use of nonaqueous solvents having higher dielectric constants tends to introduce relaxation of the electric field in the ink, resulting in obstructing the jetting of the ink.

The resin particles which is dispersed into these nonaqueous solvents should be solid at a temperature of 35° C. or less and be hydrophobic resin particles having a high affinity for the nonaqueous solvents. In addition, resins (P) used preferably have glass transition points of −5 to 110° C. or softening points of 33 to 140° C., more preferably glass transition points of 10 to 100° C. or softening points of 38 to 120° C., and most preferably glass transition points of 15 to 80° C. or softening points of 38 to 100° C.

Use of the resins having such glass transition points or softening points results in increasing the affinity between the image receiving layers' surfaces and the resin particles on the printing plate precursors and, in addition, in promoting firm bonding between the resin particles on the printing plate precursors. This increases the adhesion between image areas and the image receiving layers to improve the press life of the printing plates. On the other hand, use of resin particles which fail to fall in the respective ranges of the glass transition points or softening points as specified above results in lowering the affinity between the image receiving layers' surfaces and the resin particles or in weakening the bonding between the resin particles.

The weight-average molecular weight (Mw) of resins (P) is from $1 \times 10^3$ to $1 \times 10^6$, preferably from $5 \times 10^3$ to $8 \times 10^5$, and more preferably from $1 \times 10^4$ to $5 \times 10^5$.

Examples of such resins (P) include olefinic polymers and copolymers (for example, polyethylene, polypropylene, polyisobutyrene, ethylene-vinyl acetate copolymers, ethylene-acrylate copolymers, ethylene-methacrylate copolymers, and ethylene-methacrylic acid copolymers), vinyl chloride copolymers (for example, polyvinyl chloride and vinyl chloride-vinyl acetate copolymers), vinylidene chloride copolymers, vinyl alkanoate polymers and copolymers, allyl alkanoate polymers and copolymers, polymers and copolymers of styrene and derivatives thereof (for example, butadiene-styrene copolymers, isoprene-styrene copolymers, styrene-methacrylate copolymers, and styrene-acrylate copolymers), acrylonitrile copolymers, methacrylonitrile copolymers, alkyl vinyl ether copolymers, acrylic ester polymers and copolymers, methacrylic ester polymers and copolymers, itaconic diester polymers and copolymers, maleic anhydride copolymers, acrylamide copolymers, methacrylamide copolymers, phenolic resins, alkyd resins, polycarbonate resins, ketone resins, polyester resins, silicone resins, amide resins, hydroxyl group- and carboxyl group-modified polyester resins, butyral resins, polyvinyl acetal resins, urethane resins, rosin series resins, hydrogenated rosin resins, petroleum resins, hydrogenated petroleum resins, maleic acid resins, terpene resins, hydrogenated terpene resins, chroman-indene resins, cyclic rubber-methacrylic ester copolymers, cyclic rubber-acrylic ester copolymers, copolymers containing heterocycles which contain no nitrogen atoms (examples of the heterocycles include a furan ring, a tetrahydrofuran ring, a thiophene ring, a dioxane ring, a dioxofuran ring, a lactone ring, a benzofuran ring, a benzothiophene ring, and a 1,3-dioxetane ring), and epoxy resins.

In the present invention, the content of these resin particles dispersed in the entire oily ink is preferably from 0.5% to 20% by weight. Lower contents than the lower limit make it difficult to ensure the affinity of the ink for the image receiving layers of the printing plate precursors, which often introduces the problems of failing to obtain good images or adequate press lives. On the other hand, higher contents than the upper limit tend to obstruct the formation of uniform dispersions or to easily clog a jetting head with the ink to disturb stable jetting thereof.

Coloring materials are preferably incorporated together with the above dispersion resin particles into the oily ink used in the present invention to facilitate inspection of the printing plates which have undergone platemaking.

The coloring materials used herein include all pigments and dyes which have been hitherto used for oily ink compositions or liquid developers for electrostatic photography.

The pigments used as the coloring materials are those which are commonly used in the field of the printing technology regardless of whether the pigments are inorganic or organic. Examples of such pigments include carbon black, cadmium red, molybdenum red, chrome yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxazine pigments, indanthrene pigments, perylene pigments, perinone pigments, thioindigo pigments, quinophthalone pigments, and metal complex pigments. These known pigments can be employed without any particular limitations.

The dyes used as the coloring materials are preferably oil-soluble dyes. Examples thereof include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes, and metallo-phthalocyanine dyes.

These pigments and dyes can be employed singly or in combination. The content thereof in the entire ink preferably ranges from 0.01 to 5% by weight.

These coloring materials can be dispersed by themselves as dispersed particles into the nonaqueous solvents apart from the dispersion resin particles or can be incorporated into the dispersion resin particles. In the latter case, the pigments are covered with the resins as the dispersion resin particles prior to use in general to form resin-covered particles. On the other hand, the dyes are used as colored particles in which the dispersion resin particles' surfaces are colored with the dyes in general.

The average diameter of the resin particles, including the colored particles, which are dispersed into the nonaqueous solvents, preferably ranges from 0.05 to 5 µm, more preferably from 0.1 to 1.0 µm, and most preferably from 0.1 to 0.5 µm. These diameters have been obtained by measurement with CAPA-500 (trade name, manufactured by Horiba Seisakusho Co., Ltd.).

The nonaqueous system dispersion resin particles used in the present invention can be prepared according to the following known processes: mechanical grinding or polymerization granulation. In the mechanical grinding, materials for preparing the resin particles are mixed as needed, melted, kneaded, directly ground into fine particles with known grinders, and then dispersed together with dispersion polymers into the nonaqueous solvents by the use of wet dispersing machines (for example, ball mills, paint shakers, Kedy mills, or Dyno mills). Or materials for preparing the resin particles are kneaded together with dispersion assisting polymers (or covering polymers) beforehand. The resulting kneaded products are ground and then dispersed together with the dispersion polymers into the nonaqueous solvents. Processes for manufacturing coatings or liquid developers for electrostatic photography can be practically utilized. These processes are described, for example, in *Toryo no Ryudo to Ganryo Bunsan* (*Flow of Coatings and Dispersion of Pigments*), Translated under the supervision of Kenji Ueki, Kyoritsu Shuppan (1971); *Solomon, Toryo no Kagaku* (*Science of Coatings*); *Paint and Surface Coating Theory and Practice*; Yuji Harazaki, *Coating Kogaku* (*Coating Engineering*), Asakura Shoten (1971); and Yuji Harazaki, *Coating no Kiso Kagaku* (*Basic Science of Coating*), Maki Shoten (1977).

For the polymerization granulation, there are known procedures of nonaqueous system dispersion polymerization. The procedures are described, for example, in *Chobiryushi-polymer no Saisingijutsu* (*The Latest Technology of Ultrafine Polymers*), Compiled under the supervision of Soichi Muroi, Chapter 2, CMC Shuppan (1991); *Saikin no Densishasingenzoshisutemu to Toner zairyo no Kaihatsu.Jitsuyoka* (*Recent Development and Practical Use of Developing Systems for Electrophotography and Toner Materials*), Edited by Koichi Nakamura, Chapter 3, Nippon Kagaku Joho Co., Ltd. (1985); and K. E. J. Barrett, *Dispersion Polymerization in Organic Media*, John Wiley (1975).

The dispersion polymers are simultaneously used with dispersed particles in usual in order to stabilize the dispersed particles in nonaqueous solvents. The dispersion polymers contain as a main constituent part repeating units which are soluble in the nonaqueous solvents. The weight-average molecular weight (Mw) of the dispersion polymers preferably ranges from $1 \times 10^3$ to $1 \times 10^6$ and more preferably from $5 \times 10^3$ to $5 \times 10^5$.

The preferred nonaqueous solvent-soluble repeating units of the dispersion polymers used in the present invention include polymerization components represented by following general formula (I):

In general formula (I), $X_1$ represents —COO—, —OCO—, or —O—.

R represents an alkyl group or an alkenyl group having 10 to 32 carbon atoms and preferably 10 to 22 carbon atoms.

These groups may be either straight-chain or branched-chain groups and may contain substituent groups, although the groups are preferably unsubstituted. Examples thereof include a decyl group, a dodecyl group, a tridecyl group, a tetradecyl group, a hexadecyl group, an octadecyl group, an eicosanyl group, a docosanyl group, a decenyl group, a dodecenyl group, a tridecenyl group, a hexadecenyl group, an octadecenyl group, and a linoleyl group.

$a_1$ and $a_2$ may be the same or different from each other. They each preferably represent a hydrogen atom, a halogen atom (for example, chlorine and bromine), a cyano group, an alkyl group having 1 to 3 carbon atoms (for example, methyl, ethyl, and propyl), or —COO—$Z^1$ or —CH$_2$COO—$Z^1$, wherein $Z^1$ represents a hydrogen atom or a hydrocarbon residue which has 22 or less carbon atoms and may be substituted (for example, alkyl, alkenyl, aralkyl, alicyclic, and aryl).

$Z^1$ represents a hydrocarbon residue as well as a hydrogen atom. Preferred examples of the hydrocarbon residues include alkyl groups which have 1 to 22 carbon atoms and may be substituted (for example, methyl, ethyl, propyl, butyl, heptyl, hexyl, octyl, nonyl, decyl, dodecyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl, and 3-bromopropyl); alkenyl groups which have 4 to 18 carbon atoms and may be substituted (for example, 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, and linoleyl); aralkyl groups which have 7 to 12 carbon atoms and may be substituted (for example, benzyl, phenetyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl); alicyclic groups which have 5 to 8 carbon atoms and may be substituted (for example, cyclohexyl, 2-cyclohexylethyl, and 2-cyclopentylethyl); and aromatic groups which have 6 to 12 carbon atoms and may be substituted (for example, phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, and dodecyloylamidophenyl).

The dispersion polymers can contain other repeating units as copolymerization components together with the repeating units represented by general formula (I). The copolymerization components include all monomers as long as the monomers are copolymerizable with monomers which constitute the repeating units represented by general formula (I).

The content of the polymeric components represented by general formula (I) in molecules of the dispersion polymers is preferably 50% by weight or more and more preferably 60% by weight or more.

Examples of these dispersion polymers include dispersion-stabilizing resin (Q-1) which is used in the examples of the present invention and other commercially available products (for example, Solprene 1205, manufactured by Asahi Chemical Industry Co., Ltd.).

When the particles of resins (P) described above are intended to be prepared as emulsified products (latexes), the dispersion polymers are preferably added to reaction mixtures prior to polymerization.

When the dispersion polymers are used, the content thereof in the entire ink ranges from about 0.05 to 4% by weight.

In the present invention, the dispersion resin particles and the colored particles (or coloring material particles) in the oily ink are preferably voltage-detectable particles with positive or negative charge.

In order to provide the voltage-detectable properties to these particles, the techniques for the developers of wet electrostatic photography can be appropriately utilized. Voltage-detectable materials and other additives used for providing the voltage-detectable properties are described in the preceding *Recent Development and Practical Use of Developing Systems for Electrophotography and Toner Materials*, pages 139 to 148; *Denshishashingijutsu no Kiso to Oyo* (*Bases and Applications of Electrophotographic Technology*), Edited by Denshishashin-gakkai, pages 497 to 505, Coronasha (1988); Yuji Harazaki, *Denshishashin* (*Electrophotography*), 16 (No. 2), page 44 (1977); and others.

The voltage-detectable materials and other additives are specifically described, for example, in British Patents 893,429 and 934,038, U.S. Pat. Nos. 1,122,397, 3,900,412, and 4,606,989, JP-A-60-179751, JP-A-60-185963, and JP-A-2-13965.

The content of charge regulators as described above is preferably from 0.001 to 1.0 part by weight, based on 1000 parts by weight of the dispersion media which act as carrier liquids. A variety of additives can be further used as needed. The maximum total amount of these additives is limited by the electric resistance of the oily ink. That is, when the electric resistance of the ink is below $10^9$ Ωcm in condition where dispersed particles are excluded from the ink, it is difficult to obtain images of good continuous gradation and, therefore, the respective amounts of the additives need to be controlled so as not to exceed this limit.

A process for forming images on the above-mentioned lithographic printing plate precursors (hereinafter occasionally referred to as "masters") is described below. One of device systems for performing the process is shown in FIG. 1.

Figure 1:
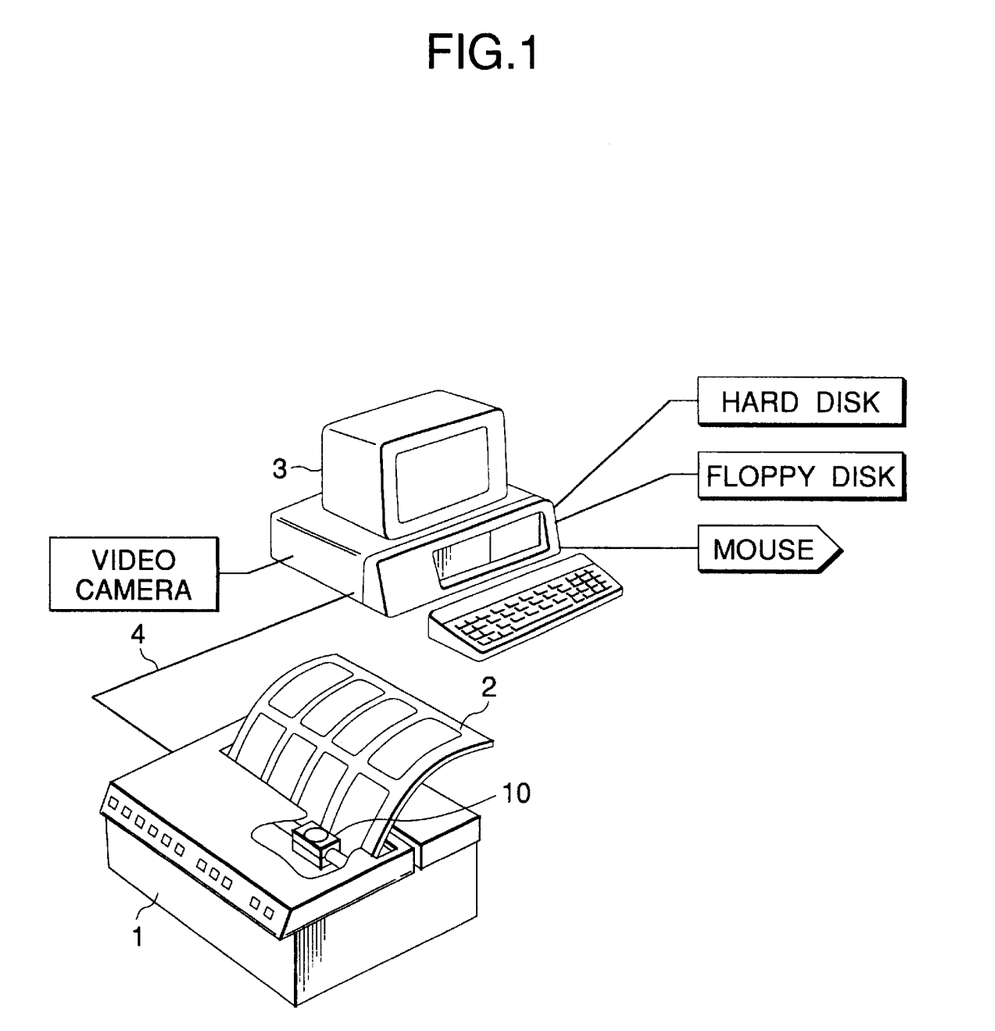
FIG. 1 is a schematic view showing a device system used in the present invention as an example.

The device system shown in FIG. 1 contains ink-jet recording device 1 in which the oily ink is used.

As shown in FIG. 1, pattern information of images (figures and writings) that should be formed on master 2 is first supplied from an information source such as computer 3 through a transmission means such as path 4 to ink-jet recording device 1 in which the oily ink is used. The oily ink is stored within ink-jet recording head 10 of recording device 1 and minute droplets of the ink are sprayed from head 10 on to master 2 according to the above-mentioned information, when master 2 passes through recording device 1. Consequently, the ink adheres to master 2 in the above-mentioned pattern. Thus, image formation on master 2 is achieved to obtain a printing master (printing plate precursor).

Figure 2:
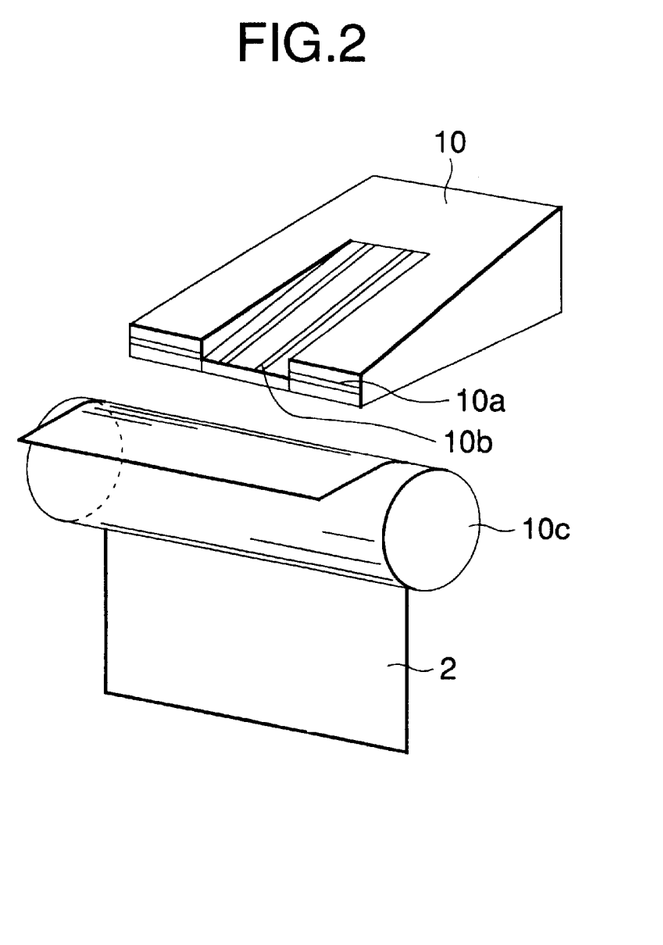
FIG. 2 is a schematic view showing an important section of an ink-jet recording device used in the present invention.
Figure 3:
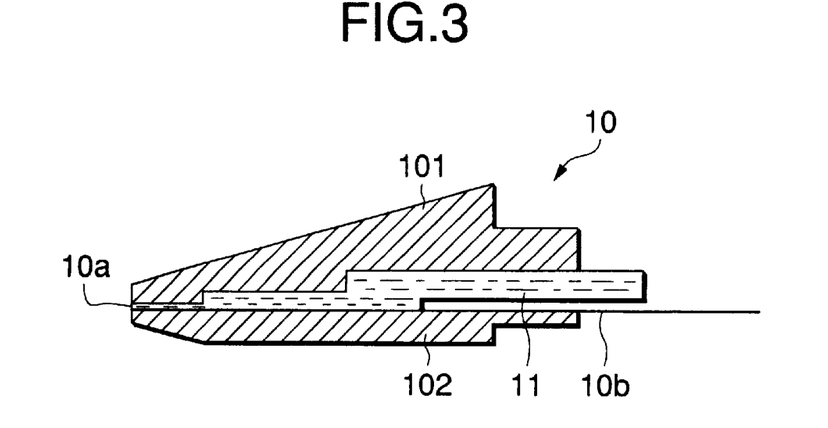
FIG. 3 is a cross-sectional view of a head of the ink-jet recording device used in the present invention.

A structure of the ink-jet recording device in the device system of FIG. 1 is illustrated in FIG. 2 and FIG. 3. In FIG. 2 and FIG. 3, members common to those in FIG. 1 are indicated by the same signs.

FIG. 2 is a schematic view showing an important section of the ink-jet recording device. FIG. 3 is a partial cross-sectional view of the head.

Head 10 mounted in the ink-jet recording device has a slit placed between upper unit 101 and lower unit 102 as shown in FIG. 2 and FIG. 3. The tip of the slit forms emission slit 10*a*. Emission electrodes 10*b* are arranged in the slit which is filled with oily ink 11.

In head 10, voltage is applied to emission electrodes 10*b* according to digital signals of the pattern information of images. As shown in FIG. 2, counter electrode 10c is provided opposite emission electrodes 10b and master 2 is provided on counter electrode 10c. A circuit is made between emission electrodes 10b and counter electrode 10c by applying voltage and oily ink 11 is jetted from emission slit 10a of head 10 so that an image is formed on master 2 provided on counter electrode 10c.

It is preferred that the tips of emission electrodes 10b are as narrow as possible to attain image formation of high quality, for example, in setting.

For example, head 10 in FIG. 3 is filled with the oily ink and setting with a 40-μm halftone dot can be formed on master 2 by applying a 3-kilovolt pressure between emission electrodes 10b and counter electrode 10c at an interval of 1.5 mm for 0.1 millisecond by the use of emission electrodes 10b which have tips of 20-μm width.

The present invention is illustrated in detail by means of examples given below. However, the scope of the present invention is not limited by these examples.

Preparation examples of resin particles (PL) for the ink are first given.

PREPARATION EXAMPLE 1

Preparation of Resin Particles (PL-1)

A mixture of 10 g of dispersion-stabilizing resin (Q-1) having a structure shown below, 100 g of vinyl acetate, and 384 g of Isoper H was heated to 70° C. with stirring in a stream of nitrogen. 0.8 g of 2,2'-azobis(isovaleronitrile) (abbreviated as "A.I.V.N.") was added as a polymerization initiator to the heated mixture and the resulting mixture was allowed to react for 3 hr. After 20 min after adding the initiator, white turbidity appeared and the temperature of the reaction mixture rose up to 88° C. Further, 0.5 g of the initiator was supplemented and the reaction was continued for 2 hours. The resulting reaction mixture was then maintained at 100° C. with stirring for 2 hours to remove unreacted vinyl acetate. The chilled reaction mixture was passed through 200-mesh nylon cloth and the white dispersion thus obtained was a latex which exhibited a polymerization degree of 90%, contained resin particles with an average particle diameter of 0.23 μm, and formed a highly monodispersed system. The particle diameters were measured with CAPA-500 (Manufactured by Horiba Seisakusho Co., Ltd.).

Dispersion-Stabilizing Resin (Q-1):

Part of the white dispersion was centrifuged at $1\times10^4$ rpm for 60 min and resin particles precipitated were collected and dried. The resin particles had a weight-average molecular weight (Mw: as a polystyrene-converted GPC value) of $2\times10^5$ and a glass transition point (Tg) of 38° C.

EXAMPLE 1

A 5% aqueous solution of calcium chloride was applied in an amount of 20 g/m² to wood free paper having a basis weight of 100 g/m² and dried to prepare electrically conductive base paper. An aqueous latex of a ethylene-methyl acrylate-acrylic acid copolymer (molar ratio 65:30:5) was applied to both the sides of the base paper prepared above so as to be 0.2 g/m² in dry weight and then dried. Subsequently, a polyethylene film of 25-μm thickness was laminated to both the sides of the base paper by the extrusion method in which pellets prepared by fusing and kneading 70% by weight of a low-density polyethylene having a density of 0.920 g/cc and a melt index of 5.0 g/10 min, 15% by weight of a high-density polyethylene having a density of 0.950 g/cc and a melt index of 8.0 g/10 min, and 15% by weight of electrically conductive carbon were used, thus to obtain a support of the present invention which had the polyethylene layers of uniform thickness on both the sides.

The support thus obtained is hereinafter referred to as "water-resistant support 1".

The surfaces of water-resistant support 1 had a Cobb water absorption of 0.01 g/m² (45-min value) and a Bekk smoothness of 1500 sec/10 cc.

Subsequently, one of the polyethylene layers of the support was subjected to corona discharge treatment at 5 KVA.sec/m² and the coating solution having a composition given below was applied to the layer so as to be 15 g/m² in dry weight and dried to form an image receiving layer. Adhesion of softened polyethylene to a pass roll was not observed at all even when the image receiving layer was dried at a temperature of 100° C. for 1 min.

Coating Solution for Image Receiving Layer

A mixture of 100 g of dry zinc oxide, 3.0 g of binder resin (B-1), 17.0 g of binder resin (B-2) (Binder resins (B-1) and (B-2) have structures shown below, respectively), 0.15 g of benzoic acid, and 155 g of toluene was dispersed with a wet dispersing machine, homogenizer (manufactured by Nippon Seiki Co., Ltd.), at $6\times10^3$ rpm for 3 min.

A printing plate precursor thus produced is referred to as sample 1.

Mw $5\times10^4$ The figures are weight ratios.

Binder Resin (B-1):

Mw $9 \times 10^3$

-continued

Binder Resin (B-2):

Mw 4×10⁴ The figures are weight ratios.

EXAMPLE 2

Both the sides of the base paper used in Example 1 underwent corona discharge treatment at 5 KVA.sec/m². A polyethylene film of 25-μm thickness was then laminated to both the sides of the base paper thus treated by the extrusion method in which pellets prepared by fusing and kneading 15% by weight of a low-density polyethylene having a density of 0.925 g/cc and a melt index of 3.0 g/10 min, 70% by weight of a high-density polyethylene having a density of 0.955 g/cc and a melt index of 15.0 g/10 min, and 15% by weight of electrically conductive carbon were used, thus to obtain a support of the present invention which had the polyethylene layers of uniform thickness on both the sides.

The support thus prepared is hereinafter referred to as "water-resistant support 2".

The surfaces of water-resistant support 2 had a Cobb water absorption of 0.01 g/m² (45-min value) and a Bekk smoothness of 1500 sec/10 cc.

Subsequently, similarly to Example 1, one of the polyethylene layers was subjected to corona discharge treatment and an image receiving layer was provided thereon in a manner similar to sample 1. When the image receiving layer was applied and dried, adhesion of the polyethylene layer to a pass roll was not observed at all.

A printing plate precursor thus produced is referred to as "sample 2".

COMPARATIVE EXAMPLE 1

Wood free paper having a basis weight of 100 g/m² is used as a substrate. A coating for an underlayer having the following composition was applied to one side of the substrate by use of a wire bar to form an underlayer of 10 g/m² in dry weight. The surface of the underlayer, which had a smoothness of 150 sec/10 cc, was adjusted to a smoothness of 1500 sec/10 cc by calendering.

The surface treated had a Cobb water absorption of 2 g/m² (45-min value).

Coating for Underlayer
  Silica Gel
    10 parts by weight
  SBR Latex (50 wt % aqueous dispersion, Tg 25° C.)
    92 parts by weight
  Clay (45 wt % aqueous dispersion)
    110 parts by weight
  Melamine (80 wt % aqueous dispersion)
    5 parts by weight
  Water
    191 parts by weight Subsequently, a coating for a back coat layer having a composition given below was applied to the other side of the substrate by use of a wire bar to form a back coat layer of 12 g/m² in dry weight. The back coat layer underwent calendering in a condition set so as to be about 50 sec/10 cc in smoothness.

The surface of the back coat layer had a Cobb water absorption of 5 g/m² (45-min value).

Coating for Back Coat Layer
  Kaolin (50% aqueous dispersion)
    200 parts by weight
  Aqueous Solution of Polyvinyl Alcohol (10%)
    60 parts by weight
  SBR Latex (Solid Content 49%, Tg 0° C.)
    100 parts by weight
  Initial Condensation Product of Melamine Resin (Solid Content 80%, Sumirez Resin SR-613)
    5 parts by weight A support thus prepared is hereinafter referred to as "water-resistant support 3".

The same image receiving layer as in Examples 1 and 2 was provided on the underlayer of water-resistant support 3.

A printing plate precursor thus produced is referred to as "sample 3".

Servo Plotter DA8400 manufactured by Graphtec Corp. which can draw images by utilizing personal computer output was converted so that an inkjet head shown in FIG. 2 is mounted on the pen plotter section. Setting was performed on the lithographic printing plate precursors, samples 1 to 3, which were set on the counter electrode that was placed 1.5 mm apart from the inkjet head by the use of the following oily ink (IK-1), thus to perform platemaking.

Oily Ink (IK-1)

Ten g of a dodecyl methacrylate-acrylic acid copolymer (95/5 in weight ratio), 10 g of Nigrosine, and 30 g of Shellsol 71 were placed together with glass beads in a paint shaker (manufactured by Tokyo Seiki Co., Ltd.) and dispersed for 4 hours to obtain a finely divided Nigrosine dispersion.

A black oily ink was prepared by diluting 6 g (as solid content) of resin particles (PL-1) for ink prepared in Preparation Example 1, 2.5 g of the Nigrosine dispersion prepared above, 15 g of FOC-1400 (tetradecyl alcohol, manufactured by Nissan Chemical Industries Co., Ltd.), and 0.08 g of an octadecene-maleic acid monooctadecylamide copolymer with 1 liter of Isoper G.

After platemaking was performed in the same manner as described above; a desensitizing solution (ELP-EZ: trade name, manufactured by Fuji Photo Film Co., Ltd.) was placed in the etcher section of a fully-automatic printing machine (AM-2850, trade name, manufactured by AM, Inc.); a solution which was prepared by diluting a desensitizing solution (SICS) four times with distilled water was placed as a fountain solution in the fountain solution saucer of the printing machine; and the printing plates (from samples 1 to 3) were then set on the printing machine and printing was performed by the use of a black ink for offset printing.

For evaluation of the press life, the number of printed sheets was counted until falling of images was observed by visual inspection. The results are shown in Table 1 below.

TABLE 1

| Samples | Smoothness of Supports (sec/10 cc) | Cobb Water Absorption of Supports (g/m², 45-min Value) | Press Lives (sheets) |
|---|---|---|---|
| 1 (Example 1) | 1500 | 0.01 | 15,000 |
| 2 (Example 2) | 1500 | 0.01 | 15,000 |
| 3 (Comparative Example 1) | 1500 | front 2.0 back 5.0 | 3,000 |

Samples 1 and 2 supports of which have a Cobb water absorption of as low as 0.01 g/m² have a press life of as much as 15,000 sheets. On the other hand, sample 3 of Comparative Example which has a Cobb water absorption of as high as 2.0–5.0 g/m² has a press life of as little as 3000 sheets. The result shows that water absorbed by a support during printing causes swelling or elongation thereof, which results in deformation of an image receiving layer or peeling thereof from the support. This is considered to cause images to fall off.

EXAMPLES 3 AND 4 AND COMPARATIVE EXAMPLE 2

A dispersion having the following composition was applied to the supports 1, 2, and 3 so as to be 6 g/m² in dry weight to form image receiving layers, respectively. The printing plate precursors thus produced are referred to as samples 4, 5, and 6, respectively.

| | |
|---|---|
| Gelatin (Wako Junyaku Co., Ltd., 1st class glade chemical) | 3 g |
| Colloidal Silica (Manufactured by Nissan Chemical Industries, Ltd., Snowtex R-503, 20% Aqueous Solution) | 20 g |
| Silica Gel (Manufactured by Fuji Sylysia Chemical Ltd., Sylysia 310) | 7 g |
| Hardening Agent | 0.4 g |
| Distilled Water | 100 g |

These components were dispersed together with glass beads with a paint shaker for 10 min.

For platemaking of these lithographic printing plate precursors, samples 4, 5, and 6, setting was carried out by the use of oily ink (IK-1) similarly to samples 1, 2, and 3.

After the platemaking, these samples were subjected to printing by the use of a fully automatic printer (AM-2850) without desensitizing treatment. Distilled water was used as a fountain solution and the black ink for offset printing was used as an ink. The results are shown in Table 2 below.

TABLE 2

| Samples | Smoothness of Supports (sec/10 cc) | Cobb Water Absorption of Supports (g/m² 45-min value) | Press Lives (sheets) |
|---|---|---|---|
| 4 (Example 3) | 1500 | 0.01 | 10,000 |
| 5 (Example 4) | 1500 | 0.01 | 10,000 |
| 6 (Comparative Example 2) | 1500 | front 2.0 back 5.0 | 2,000 |

Samples 4 and 5 supports of which have a Cobb water absorption of as low as 0.01 have a press life of as much as 10,000 sheets, compared with sample 6 which has a Cobb water absorption of as high as 2.0–5.0 and has only a press life of as small as 2,000 sheets.

Thus, the present invention presents a process for producing printing plates which produce printed matter of sharp images and have excellent press lives.

While the invention has been described in detail and with reference to specific embodiments thereof, it will be apparent to one skilled in the art that various changes and modifications can be made therein without departing from the spirit and scope thereof.

What is claimed is:

1. A process for producing a lithographic printing plate by an ink-jet system comprising:
    placing a lithographic printing plate precursor comprising a water-resistive support having provided thereon an image receiving layer between a head comprising an emission slit having an emission electrode therein and a counter electrode, and
    emitting an oily ink from the emission slit by applying voltage according to a digital signal of image pattern information to the emission electrode to form an image on the image receiving layer of the lithographic printing plate precursor;
    wherein said water-resistive support is a paper support both sides of which are covered with a resin;
    wherein the resin which covers both sides of the paper support is polyethylene which is a mixture comprising 10 to 90% by weight of a low-density polyethylene having a density of 0.915 to 0.930 g/cc and a melt index of 1.0 to 30.0 g/10 cc and 10 to 90% by weight of a high-density polyethylene having a density of 0.940 to 0.970 g/cc and a melt index of 1.0 to 30.0 g/10 cc; and
    wherein the oily ink comprises a nonaqueous solvent of an electric resistance of $10^9$ $\Omega$cm or more and a dielectric constant of 3.5 or less and resin particles dispersed therein which are solid at ordinary temperature and are hydrophobic.

2. The process as claimed in claim 1, wherein the paper support has a thickness of from 50 to 200 $\mu$m.

3. The process as claimed in claim 1, wherein the resin coat layer which covers both sides of the paper support has a thickness of from 5 to 50 $\mu$m.

4. The process as claimed in claim 1, wherein the resin coat layer which covers both sides of the paper support has a thickness of from 10 to 30 $\mu$m.

5. The process as claimed in claim 1, wherein the water-resistant support has water absorption by Cobb test of 0.1 g/m² or less (45-min value).

6. The process as claimed in claim 1, wherein the water-resistant support has water absorption by Cobb test of 0.05 g/m² or less (45-min value).

7. The process as claimed in claim 1, wherein the image receiving layer is a hydrophilic layer comprising inorganic pigment and a hydrophilic binder.

8. The process as claimed in claim 1, wherein the image receiving layer is a layer comprising zinc oxide and a hydrophobic binder, and the process further comprising subjecting the lithographic printing plate precursor having the image to desensitizing.

* * * * *